T. I. DUFFY.
TIRE CARRIER.
APPLICATION FILED JUNE 19, 1912.
1,092,811.
Patented Apr. 7, 1914.
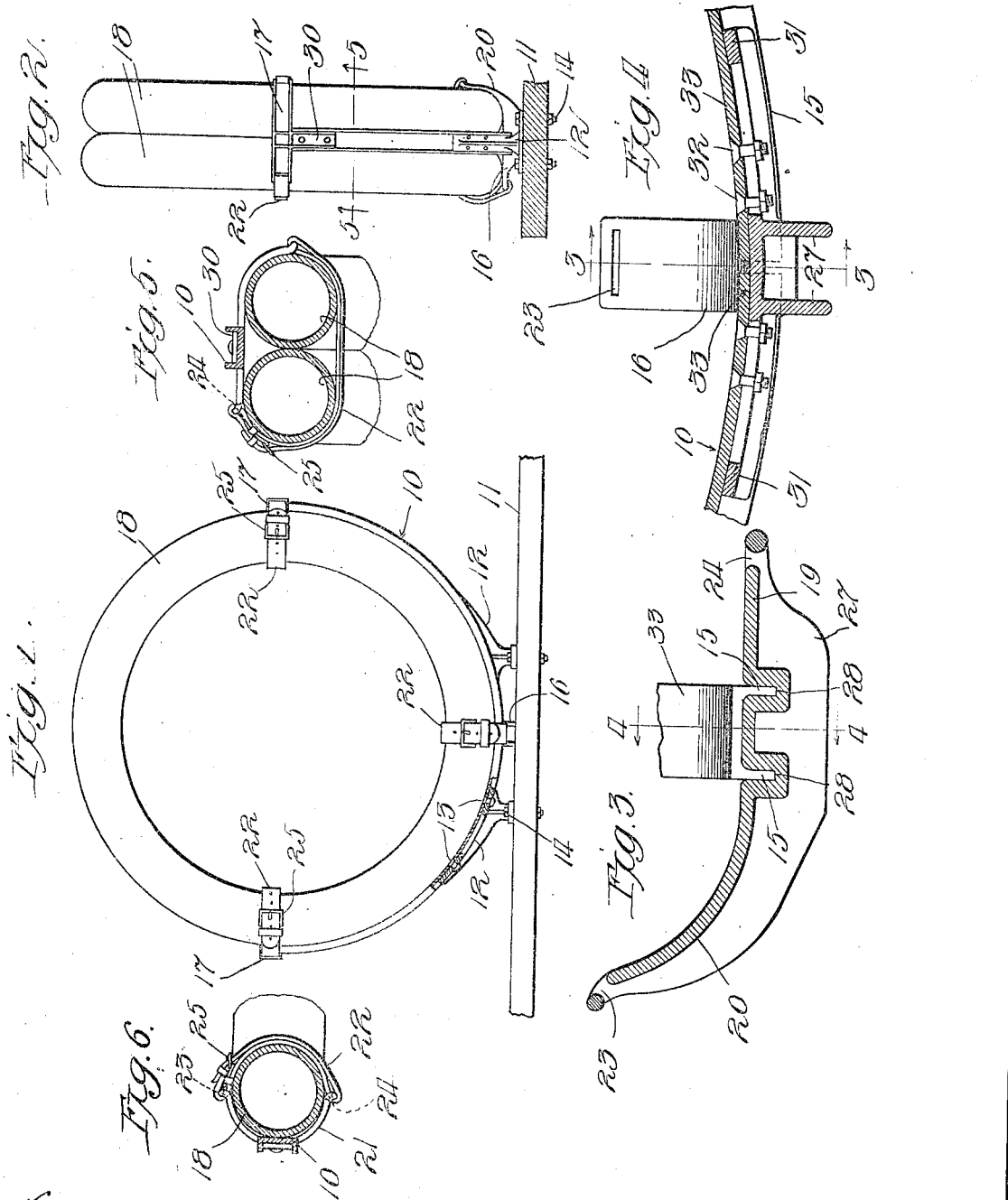

UNITED STATES PATENT OFFICE.

THOMAS I. DUFFY, OF CHICAGO, ILLINOIS.

TIRE-CARRIER.

1,092,811.  Specification of Letters Patent.  Patented Apr. 7, 1914.

Application filed June 19, 1912. Serial No. 704,630.

*To all whom it may concern:*

Be it known that I, THOMAS I. DUFFY, a citizen of the United States, and a resident of Chicago, in the county of Cook and State of Illinois, have invented certain new and useful Improvements in Tire-Carriers; and I do hereby declare that the following is a full, clear, and exact description thereof, reference being had to the accompanying drawings, and to the characters of reference marked thereon, which form a part of this specification.

This invention relates to improvements in tire carriers for motor vehicles for carrying spare tires, either the tires alone or tires and demountable rims upon which they are mounted.

Among the objects of the invention is to provide a rigid carrier of a strength ample to receive and carry one or more tires, especially tires mounted on demountable rims or wheels which are of considerable weight, and which is so constructed as to be connected to the vehicle by simple connections, requiring no supports from the body of the vehicle.

A further object of the invention is to provide a tire carrier of this character which is adjustable so as to receive tires of different diameters, whereby the major part of the equipment may be made of the same dimensions for tires of different diameters.

Other objects of the invention are to improve and simplify tire carriers for the purpose set forth, and the invention consists in the matters hereinafter set forth and more particularly pointed out in the appended claims.

In the drawings: Figure 1 is a side elevation partly in section of a type of tire carrier embodying my invention, adapted to be attached to the running board of the vehicle, showing a spare tire or tires supported therein. Fig. 2 is an edge elevation of the carrier, showing the running board in transverse section. Fig. 3 is a detail sectional view on the line 3—3 of Fig. 4. Fig. 4 is a detail sectional view on the line 4—4 of Fig. 3. Fig. 5 is a detail sectional view on the line 5—5 of Fig. 2 looking upwardly. Fig. 6 is a detail transverse section of the carrier, showing a modification of the saddle member.

As shown in the drawings, 10 designates the frame of the tire carrier which, as herein shown is attached to the running board 11 of the vehicle by means of the brackets 12, said brackets being attached by rivets 13 to the frame and by bolts 14 to the running board. The frame is made of substantially semi-circular dimensions to correspond generally to the radius of the tire to be carried thereby. As herein shown, it consists of an approximate half circle and is attached to the running board by the brackets 12 that are fixed to the frame at the sides of the lower or central part thereof. The said frame 10, as herein shown, is made of channel cross section, with the longitudinal flanges 15 of the channel member directed outwardly and the plain side or web thereof facing inwardly. The cross section of the frame may be varied while affording a tire supporting web and a longitudinal strengthening flange or flanges. The said frame carries at its lower, central portion, and at its upper ends saddle members 16, 17, respectively, which are arranged cross-wise of the frame to constitute seats or saddles to receive and support the tire or tires 18.

In one form of the saddle members the outer ends 19 thereof which are directed outwardly or away from the frame, are straight or substantially so, while the other or inner ends 20 thereof are curved upwardly and inwardly to limit the inward movement of the tires on the saddle members. The said saddle members may curve inwardly and upwardly at both ends as shown at 21 in Fig. 6. Either form of the saddle member may be adapted to carry either one or more than two tires.

The tires are confined in the saddle members by means of the straps 22 that are looped through slots 23 at the inner ends of the saddle members and with their free ends carried inwardly over the tires and through slots 24 at the other or outer ends of the saddle members, said free ends of the straps being carried through and fastened to the buckles 25 carried by the looped portions of the straps. The form of the saddle member shown in Fig. 3 permits the tires to be laterally removed from and inserted into the carrier, and is especially adapted to carriers in which the frame consists of more than a half circle, such as is shown in my co-pending application for U. S. Letters Patent, Serial No. 704,629, filed of even date herewith, while the form of the saddle members shown in Fig. 6 is adaptable to tire carriers wherein the frame consists of substantially a half circle, and in which the tires are removed upwardly therefrom. As herein shown the said saddle members are of channel form, their flanges 27 serving to stiffen the same. The central saddle member is also provided near its longitudinal center with cross grooves 28, 28 to receive the flanges 15 of the channel shaped frame, when said frame is made of channel cross section, thus affording a strong interlocking connection between the parts. The upper saddle members, or those at the ends of the frame are provided with arms 30 which are adapted to lie between the flanges of the channel frame and to be riveted thereto as shown in Fig. 2. The lower or central saddle member is shown as provided with oppositely extending arms 31, 31 which are adapted to lie between the flanges of the channel frame and to be secured thereto by the bolts 32, 32.

As a further improvement the carrier frame 10 is made of two lateral parts 33, 33, as most clearly shown in Fig. 4, and the arms 31 of the lower saddle member are longitudinally slotted to receive the bolts 32, whereby said frame members may be moved toward and from each other to adjust the carrier to tires of different diameters. Thus the carrier may be adapted to different sized tires by the use of the same frame members and saddle members. It may be desirable in adjusting the carrier through a wide range of adjustment to employ attaching brackets 12 having curved seats of different radii to engage the channel frame members.

A carrier having the general construction described may be attached by brackets supported at the rear end of the car in the manner illustrated in my aforesaid copending application for U. S. Letters Patent. In both adaptations mentioned the saddle members are rigidly connected together through the intermediary of the rigid frame 10, and no connections to the body of the vehicle are required, which tend to disfigure the body and are not separately as readily attachable to the vehicle as in my improved carrier. Moreover, the parts of the carrier are connected one to the other more rigidly and permanently than where separate attachments are made to the vehicle body and to the running board or other part of the car.

It will be understood that minor deviations may be made from the structural details herein disclosed without departing from the spirit of my invention, and the invention is not therefore limited to such details except as hereinafter made the subject of specific claims.

I claim as my invention:—

1. A tire carrier, with means for attaching it to a vehicle, said carrier comprising a part-circular frame of channel cross section, with its plain side or web arranged inwardly to constitute a tire seat, and with its flanges extending outwardly from the web to strengthen the web in both radial and lateral directions, and saddle members arranged crosswise of the frame and attached thereto.

2. A tire carrier, with means for attaching it to a vehicle, said carrier comprising a part-circular frame and saddle members arranged crosswise of the frame and attached, one to the central part and one to each end of the frame, the frame being made of two separate parts, one at each side of the central saddle member, and means to adjustably attach the frame parts to said central saddle member to increase the radius of the frame and to thereby adapt the carrier to tires of different diameters.

3. A tire carrier comprising a part-circular frame of channel cross section, with its plain side facing inwardly and with the flanges facing outwardly, and provided on its lower side with attaching brackets fitted to the channel frame between its flanges to attach the same to the running board of a vehicle, and saddle members attached one to the frame between the brackets and one at each end thereof to receive and support a tire.

4. A tire carrier comprising a part-circular frame provided at the sides of its center with attaching brackets to attach the same to the running board of a vehicle, and saddle members attached one to the frame between the brackets and one to each end thereof to receive and support a tire, said frame being composed of two members and the central saddle member being provided with oppositely extending arms which overlap the frame members, and means to adjustably attach the frame members to the arms of the central saddle member.

5. In a tire carrier, a part-circular frame provided at the sides of its center with means to attach the same to the running board of a vehicle, said frame being composed of two side members and a central member, the latter being provided with oppositely extending arms which overlap the side frame members, attaching bolts extending through said frame members and said arms, said arms being provided with elongated slots through which bolts extend, whereby the carrier may be adjusted to tires of different diameters.

6. A tire carrier, having means to attach it to a vehicle, said carrier comprising a part-circular frame of channel cross section, and saddle members attached to the central and to the end parts of the frame, the central saddle member having transverse grooves to receive the flanges of the channel frame to afford an interlocking connection between said member and said frame.

7. A tire carrier comprising a part-circular frame having a web to constitute a longitudinal tire seat and a longitudinal flange arranged beneath the tire seat, to strengthen the web against stresses in its plane and transverse thereto, and transverse saddle pieces interlocked to said frame with means for fastening a tire thereto.

8. A tire carrier comprising a part-circular frame having a plain inner side to constitute a tire seat, and longitudinally flanged on its outer side, and transverse end and central saddle members, the central saddle member being grooved to receive the flange of the frame to afford an interlocking connection between the parts.

9. A tire carrier comprising a part-circular frame having a plain inner side to constitute a tire seat and longitudinally flanged on its outer side, and transverse end and central saddle members, the central saddle member being grooved to receive the flange of the frame, said frame being made of two parts to permit the carrier to be adjusted to tires of different diameters, and the central saddle member having arms that overlap and are adjustably connected to said parts of the frame.

In testimony, that I claim the foregoing as my invention I affix my signature in the presence of two witnesses, this 14th day of June, A. D. 1912.

THOMAS I. DUFFY.

Witnesses:
G. E. DOWLE,
W. L. HALL.